United States Patent
Danner

(10) Patent No.: US 7,511,165 B2
(45) Date of Patent: Mar. 31, 2009

(54) AMINO-FUNCTIONAL SILICONE WAXES

(75) Inventor: Bernard Danner, Riedisheim (FR)

(73) Assignee: Clariant Finance (BVI) Limited, Tortola (VG)

( * ) Notice: Subject to any disclaimer, the term of this patent is extended or adjusted under 35 U.S.C. 154(b) by 321 days.

(21) Appl. No.: 10/575,154

(22) PCT Filed: Oct. 4, 2004

(86) PCT No.: PCT/IB2004/003227

§ 371 (c)(1),
(2), (4) Date: Apr. 6, 2006

(87) PCT Pub. No.: WO2005/035631

PCT Pub. Date: Apr. 21, 2005

(65) Prior Publication Data

US 2007/0122372 A1     May 31, 2007

(30) Foreign Application Priority Data

Oct. 7, 2003    (EP) .................................. 03022447

(51) Int. Cl.
C07F 7/10    (2006.01)
A61Q 5/02    (2006.01)
C08G 77/00    (2006.01)
D06M 15/643    (2006.01)

(52) U.S. Cl. .................... 556/418; 424/70.122; 528/41; 524/838

(58) Field of Classification Search ................ 524/837, 524/838; 528/21, 22, 38, 41; 252/8.63; 556/418; 424/70.122
See application file for complete search history.

(56) References Cited

U.S. PATENT DOCUMENTS

| 4,533,714 | A | 8/1985 | Sebag |
| 4,587,321 | A | 5/1986 | Sebag |
| 4,680,366 | A | 7/1987 | Tanaka |
| 4,833,225 | A | 5/1989 | Schaefer |
| 4,891,166 | A | 1/1990 | Schaefer |
| 5,025,076 | A | 6/1991 | Tanaka |
| 5,075,403 | A | 12/1991 | Kirk |
| 5,538,595 | A * | 7/1996 | Trokhan et al. ............. 162/123 |
| 5,618,525 | A | 4/1997 | Buenning |
| 5,725,736 | A | 3/1998 | Schroeder et al. |
| 6,132,739 | A | 10/2000 | Leverett |
| 6,165,444 | A | 12/2000 | Dubief et al. |
| 6,482,969 | B1 | 11/2002 | Helmrick et al. |
| 6,511,580 | B1 * | 1/2003 | Liu .......................... 162/164.4 |
| 6,858,044 | B1 | 2/2005 | Danner et al. |
| 2004/0071741 | A1 | 4/2004 | Derian |
| 2004/0138400 | A1 | 7/2004 | Lange et al. |
| 2004/0236055 | A1 | 11/2004 | Danner |
| 2005/0169878 | A1 | 8/2005 | Elder |
| 2005/0255075 | A1 | 11/2005 | Meder |
| 2007/0041930 | A1 | 2/2007 | Meder et al. |

FOREIGN PATENT DOCUMENTS

| DE | 37 19 086 A | 10/1988 |
| DE | 198 17 776 | 10/1999 |
| DE | 100 04 321 A | 8/2001 |
| DE | 102 14 290 A | 10/2003 |
| EP | 282 720 B1 | 9/1988 |
| EP | 1 512 391 A | 3/2000 |
| JP | 09-194335 | 7/1997 |
| JP | 11-012152 | 1/1999 |
| WO | WO 00/12053 | 3/2000 |
| WO | WO 02/10259 A | 2/2002 |
| WO | WO 03/029351 A | 4/2003 |
| WO | WO 03/035721 A1 | 5/2003 |
| WO | WO 03/080007 A | 10/2003 |
| WO | WO 2005/035628 | 4/2005 |

OTHER PUBLICATIONS

English Language Abstract of DE 198 17 776, Oct. 28, 1999.
English Language Abstract of DE 100 04 321 A, Aug. 9, 2001.
English Language Abstract of DE 102 14 290 A, Oct. 9, 2003.
English Language Abstract of JP 09-194335, Jul. 29, 1997.
English Language Abstract of JP 11-012152, Jan. 19, 1999.
PCT Search Report for application No. PCT/IB 2004/003220, mail dated Nov. 23, 2004.
PCT International Preliminary Examination Report for application No. PCT/IB 2004/003220, dated Aug. 23, 2005.
PCT Written Opinion of the International Searching Authority for application No. PCT/IB 2004/003220.
Co-pending U.S. Appl. No. 11/487,271, Klug, et al., filed Jul. 14, 2006.
Co-pending U.S. Appl. No. 10/575,153, Danner, filed Apr. 6, 2006.

* cited by examiner

*Primary Examiner*—Daniel M Sullivan
*Assistant Examiner*—Yate' K Cutliff
(74) *Attorney, Agent, or Firm*—Tod A. Waldrop

(57) ABSTRACT

The present invention relates to silicone waxes having plural tertiary or quaternary amino groups, their preparation and their use as softeners in the textile industry.

These waxes can be processed into stable aqueous dispersions and lead to products having a pleasant, soft hand.

10 Claims, No Drawings

AMINO-FUNCTIONAL SILICONE WAXES

The present invention concerns silicone waxes having plural tertiary or quaternary amino groups, their preparation and their use as softeners in the textile industry.

There is extensive literature on amino-functional silicone compounds. These compounds are used for example as plasticizers in the textile industry, as surface-treating agents, as thickeners or in the cosmetic industry. Nonetheless, there is a demand in the textile industry for softening substances which lead to products having a superior hand and which do not have the disadvantage of unstable emulsions in use.

It has now been found that certain silicone waxes having plural tertiary or quaternary nitrogen atoms can be processed into stable aqueous dispersions and have surprisingly good properties when used as softeners in the textile industry and lead to products having a pleasant, soft hand.

The invention accordingly provides amino-functional silicone waxes of the formulae (I) to (IV)

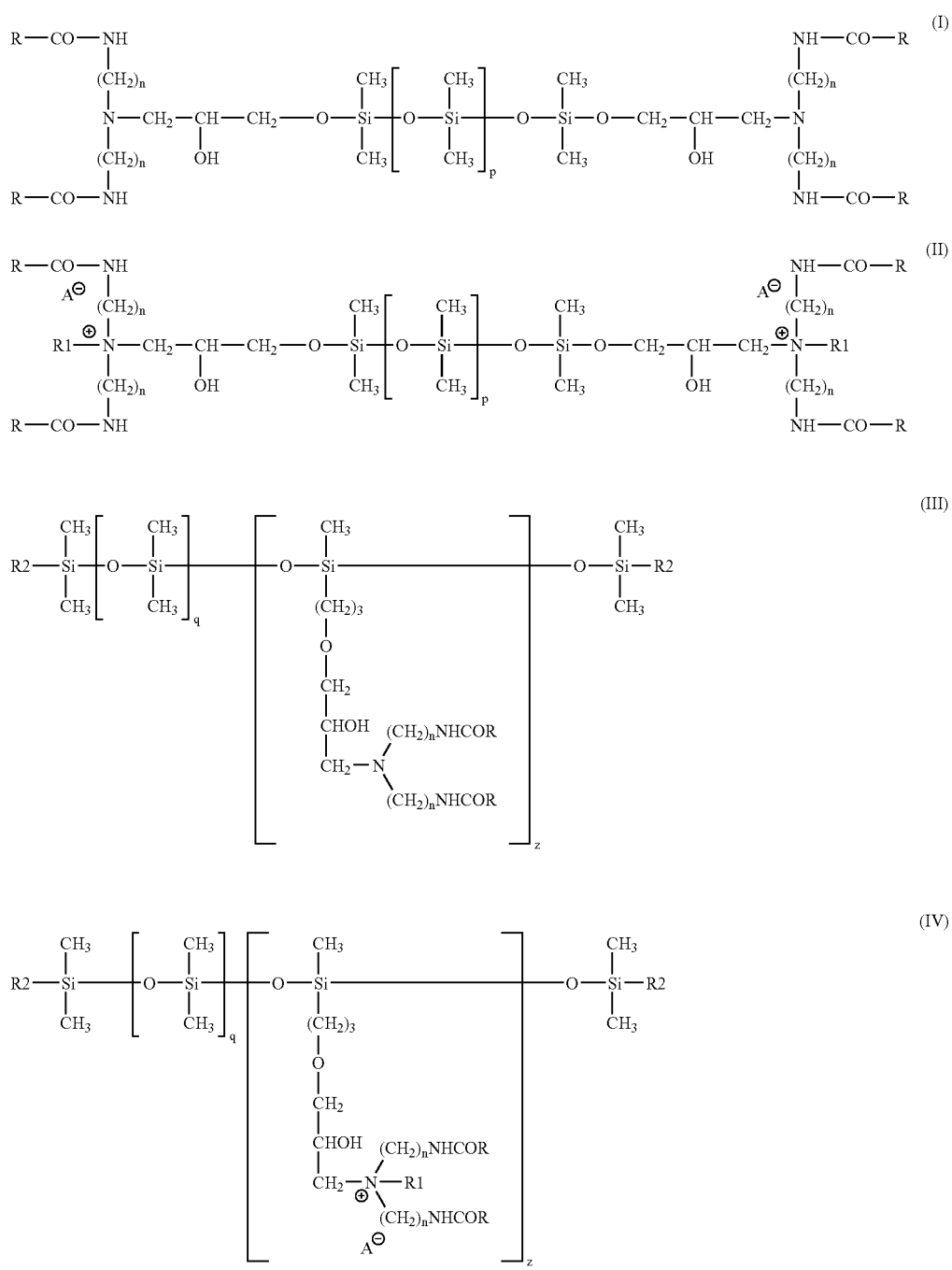

where
R is $C_{11}$-$C_{22}$-alkyl, linear or branched,
R1 is $C_1$-$C_7$-alkyl or benzyl, preferably methyl or benzyl,
R2 is —OH, —$CH_3$, —$OCH_3$, —$OC_2H_5$,
$A^-$ is $CH_3OSO_3^-$, chloride, bromide, iodide or tosylsulfate, preferably $CH_3OSO_3^-$ or chloride,
n is 2 or 3,
p is 10-200, preferably 20-50,
q+z is 10-400, preferably 15-200, and
q/z is 5-50, preferably 10-30.

These waxes, whether in the quaternized form (II) and (IV) or in the non-quaternized form (I) and (III), exhibit good properties when used as softeners. Their great advantage is that they can be used in the form of dispersions which, compared with emulsions, have a higher shearing force stability.

The present invention further provides for the preparation of the aforementioned silicone waxes. The initial step is to prepare fatty acid diamides by condensation of fatty acids, for example stearic acid or lauric acid, with diethylenetriamine or dipropylenediamine.

The resultant fatty acid diamide is reacted with silicone oils of the general formula (V)

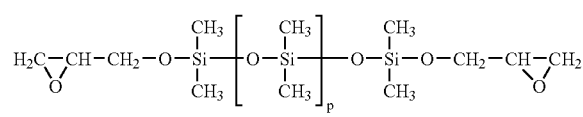

V where p has the same meaning as in formula (I) or (II), to prepare the waxes of formula (I) or (II), or subsequently quaternized with the customary quaternizing agents such as methyl sulfate, ethyl sulfate, methyl halide, benzyl chloride or tosyl sulfate to prepare the waxes of the formula (II). The starting materials and their preparation will be known to one skilled in the art.

To prepare the waxes of the formula (III) or (IV), the resultant fatty acid diamide is reacted with silicone oils of the general formula (VI)

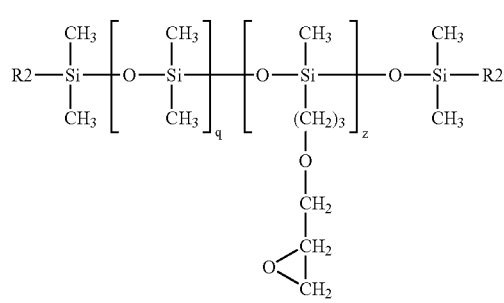

VI where R2, (q+z) and q/z have the same meaning as in formula (III) or (IV), and to prepare the waxes of the formula (IV), the resultant fatty acid diamide is subsequently quaternized with the customary, aforementioned quaternizing agents.

The present invention further provides for the use of the aforementioned silicone waxes as softeners in the textile industry. The silicone waxes obtained can be converted by means of dispersants into aqueous dispersions which have a higher shearing force stability than emulsions and are very useful for softening textiles in that the material acquires a pleasant, soft hand.

EXAMPLES

1. Preparation of Fatty Acid Diamides

Fatty Acid: RCOOH 1.1 Preparation of R—$CONH(CH_2)_2NH(CH_2)_2NHCO$—R 2 mol of fatty acid are heated to 105° C. under nitrogen; 1 mol of diethylenetriamine is then added dropwise while at the same time the temperature is raised to 130° C. This is followed by 24 hours of condensation at 130° C. under a slow stream of nitrogen using a distillation bridge. The reaction mixture is subsequently discharged. The acid number of the reaction mixture (number of mg of KOH to neutralize 1 g of product) is less than 7. The resultant amount of condensation product requires less than 1.1 mol of perchloric acid to titrate the free amino groups.

1.2 Preparation of R—$CONH(CH_2)_3NH(CH_2)_3NHCO$—R 1.1 is repeated using dipropylenediamine instead of diethylenediamine.

|  | Melting point of diamides (° C.) | | |
| --- | --- | --- | --- |
|  | Lauric acid | Stearic acid | Behenic acid |
| Diethylenetriamine-1,3-diamide | 110 (Product $D_1$) | 118 (Product $D_2$) | 123 (Product $D_3$) |
| Dipropylenetriamine-1,3-diamide | 106 (Product $D_4$) | 117 (Product $D_5$) | 122 (Product $D_6$) |

2. Preparation of Silicone Waxes 2.1 Silicone Waxes $W_1$-$W_6$ 661.5 parts of the silicone oil of the formula

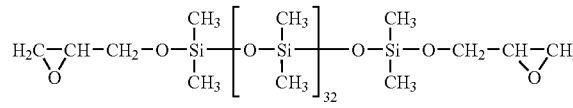

are reacted at 150° C. under nitrogen for 14 hours with x parts of the diamides $D_1$ to $D_6$. A check is subsequently carried out to see that glycidyl groups are no longer present. The following waxes are obtained:

| Diamide | x (parts) | Silicone wax |
| --- | --- | --- |
| $D_1$ | 233.5 | $W_1$ |
| $D_2$ | 317.5 | $W_2$ |
| $D_3$ | 373.5 | $W_3$ |
| $D_4$ | 247.5 | $W_4$ |
| $D_5$ | 331.5 | $W_5$ |
| $D_6$ | 387.5 | $W_6$ |

The waxes have the following structure:

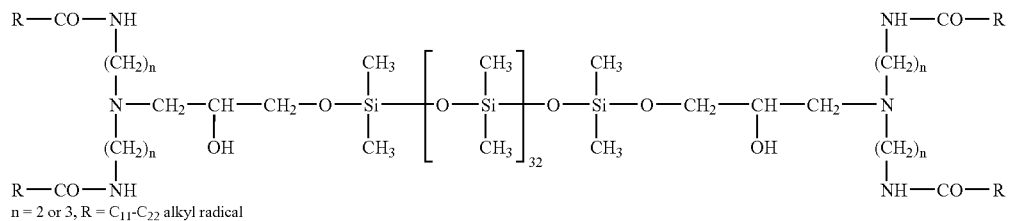

n = 2 or 3, R = $C_{11}$-$C_{22}$ alkyl radical

2.2 Silicone Waxes $W_7$-$W_{12}$ 661.5 parts of the silicone oil of the formula

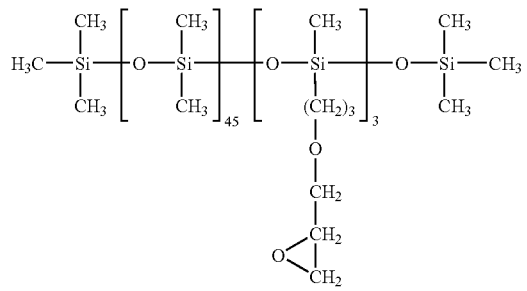

are reacted at 150° C. under nitrogen for 14 hours with x parts of the diamides $D_1$ to $D_6$. A check is subsequently carried out to see that glycidyl groups have reacted quantitatively. The following waxes are obtained:

| Diamide | x (parts) | Silicone wax |
|---|---|---|
| $D_1$ | 230.9 | $W_7$ |
| $D_2$ | 313.9 | $W_8$ |
| $D_3$ | 369.3 | $W_9$ |
| $D_4$ | 244.7 | $W_{10}$ |
| $D_5$ | 327.8 | $W_{11}$ |
| $D_6$ | 383.2 | $W_{12}$ |

3. Preparation of Quaternized Silicone Waxes $WQ_1$-$WQ_{12}$ x parts of silicone wax W are melted and allowed to react with 25.2 parts of dimethyl sulfate for 2 hours at about 70-75° C.

| | Silicone wax W | |
|---|---|---|
| W | x (parts) | $WQ_{()}$ |
| $W_1$ | 358.0 | 1 |
| $W_2$ | 391.6 | 2 |
| $W_3$ | 414.0 | 3 |
| $W_4$ | 363.6 | 4 |
| $W_5$ | 397.2 | 5 |
| $W_6$ | 419.6 | 6 |
| $W_7$ | 541.5 | 7 |
| $W_8$ | 591.9 | 8 |
| $W_9$ | 625.5 | 9 |
| $W_{10}$ | 549.9 | 10 |
| $W_{11}$ | 600.3 | 11 |
| $W_{12}$ | 633.9 | 12 |

The waxes have the following structure:

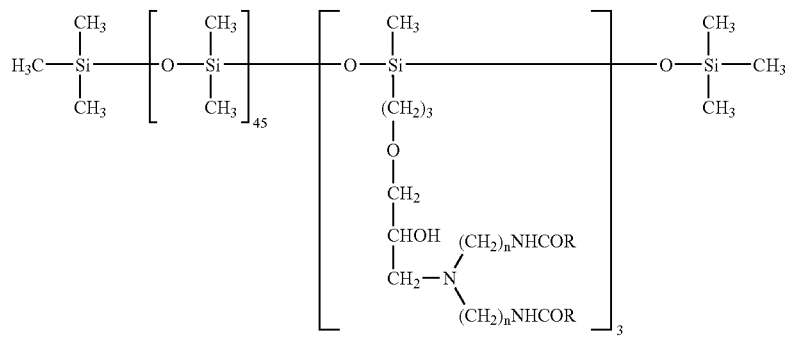

n = 2 or 3, R = $C_{11}$-$C_{22}$ alkyl radical

Waxes having the structures:

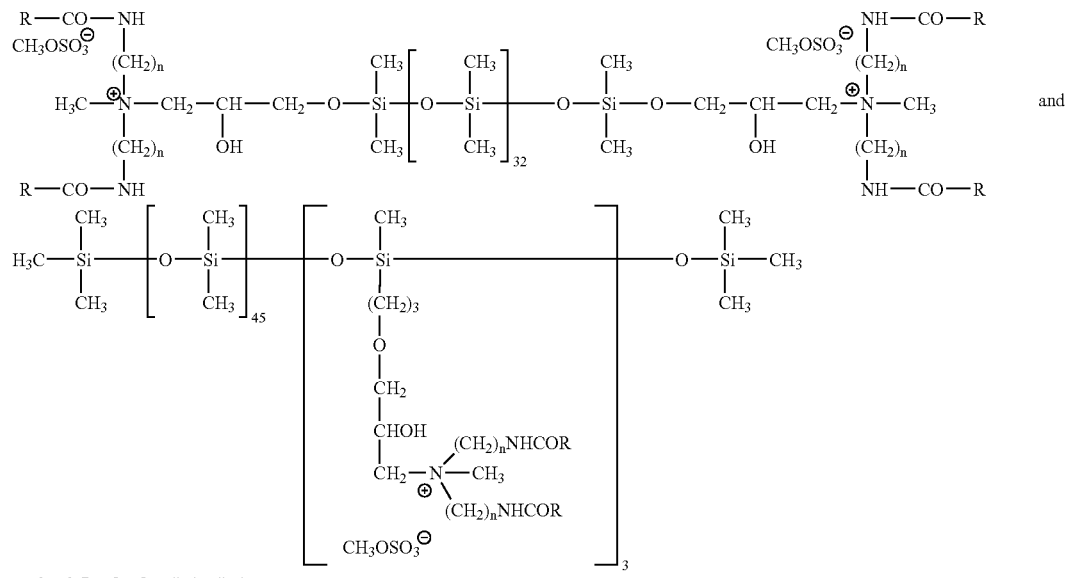

n = 2 or 3, R = $C_{11}$-$C_{21}$ alkyl radical are obtained.

4. Preparation of End Products 4.1 Based on Silicone Waxes $W_1$-$W_{12}$ 125.0 parts of silicone wax (W) are melted. 25.0 parts of a 70% solution of

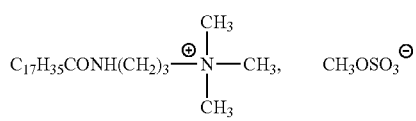

(dispersant 1) in propylene glycol and also 37.5 parts of stearyl poly-10-glycol ether (dispersant 2) are then added. As soon as there is a homogeneous melt, 800.0 parts of water are added in increments with stirring. Finally, 12.5 parts of glacial acetic acid are added. This gives 1000.0 parts of a 12.5% silicone wax dispersion (W-E).

4.2 Based on Quaternary Silicone Waxes $WQ_1$-$WQ_{12}$ 4.1 is repeated except that the silicone waxes (WQ) are used instead of the silicone waxes (W) and 12.5 parts of water are added at the end instead of 12.5 parts of glacial acetic acid. This gives 1000.0 parts of a 12.5% silicone wax dispersion (WQ-E).

The products $W_1$-E to $W_{12}$-E and also $WQ_1$-E to $WQ_{12}$-E are very stable to shearing force; they can be applied to textile material (cotton and synthetic fibres) both in the padding process and in the exhaust process. The finished textile materials possess an excellent, soft, pleasant, smooth hand.

APPLICATION EXAMPLES

The following finishing operations were carried out:

Exhaust Process The finished substrate is added to an aqueous liquor which, based on the substrate, contains 0.5% to 4.0% of the end products described in the examples, at about 40° C. and a liquor ratio of 6:1 to 20:1, in a laboratory jet. After 20 minutes at pH 5.0 to 6.0 (40° C.) and continuous agitation of the substrate, the substrate is removed from the liquor, whizzed and dried tensionlessly at 140° C. for 70-90 seconds.

Padding Process The finished substrate is padded at room temperature, to a 100% dry weight increase, with an aqueous liquor which contains 15 to 60 g/l of the end products W-E or WQ-E. The padded material is subsequently dried at 140° C. for 70-90 seconds.

| Substrate: | |
|---|---|
| Exhaust process: | Tricot fabric, dyed, with or without setting |
| | 100% cotton |
| | polyester (50%)/cotton (50%) |
| Padding process: | Tricot or woven fabric, dyed, with or without setting |
| | 100% cotton |
| | polyester (50%)/cotton (50%) |
| | polyester (100%) |
| | polyacrylonitrile (100%) |
| | nylon 6 (100%) |

Testing: Softness can be tested pairwise or using a handle-O-meter (for example a 211-5 Twing Albert). The finished samples are first conditioned (24 hours, 20° C., 65% relative humidity) before being assessed.

All the finishes show a distinct improvement in softness compared with unfinished fabric.

The invention claimed is:

1. An amino-functional silicone wax of the formulae (I) to (IV)

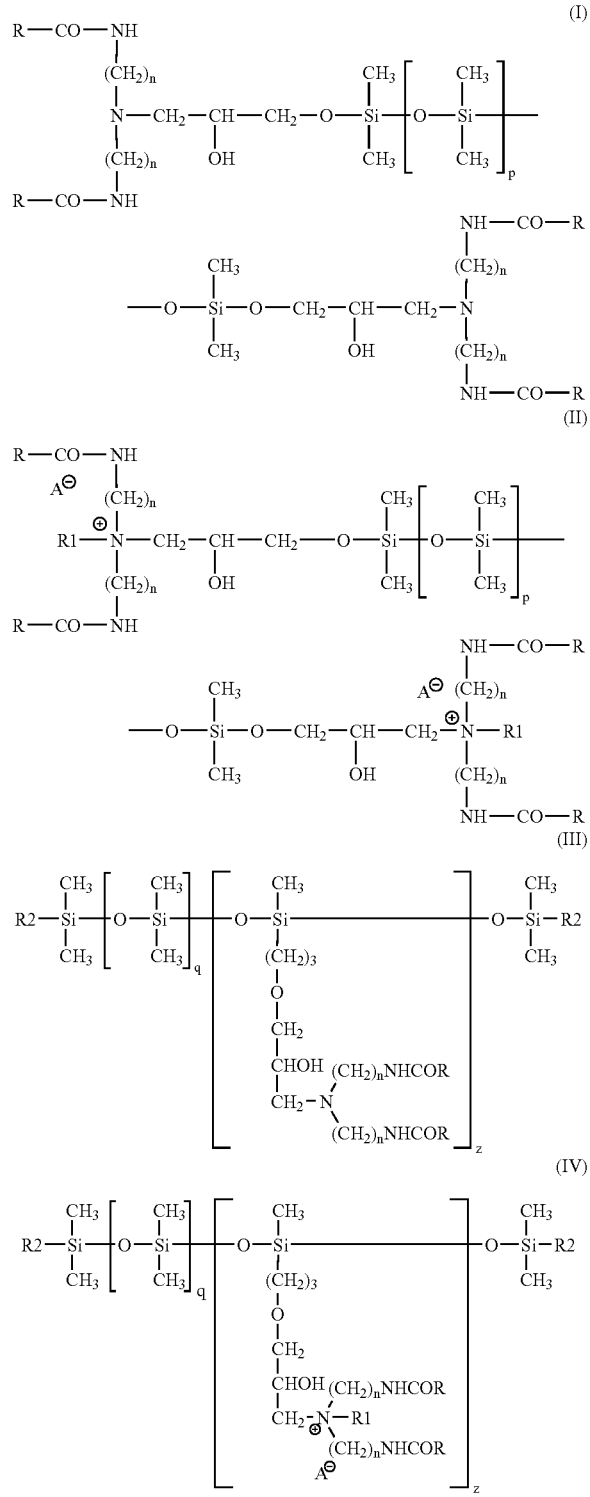

where
R is $C_{11}$-$C_{22}$-alkyl, linear or branched,
R1 is $C_1$-$C_7$-alkyl or benzyl,
R2 is —OH, —$CH_3$, —$OCH_3$, —$OC_2H_5$,
A⁻ is $CH_3OSO_3^-$, chloride, bromide, iodide or tosylsulfate,
n is 2 or 3,
p is 10-200,
q+z is 10-400, and
q/z 5-50.

2. An amino-functional silicone wax according to claim 1 wherein
R, R2 and n are each as defined above,
R1 is methyl or benzyl,
A⁻ is $CH_3OSO_3^-$ or chloride,
p is 20-50,
q+z is 15-200, and
q/z is 10-30.

3. A process for preparing an amino-functional silicone wax of formula (I) according to claim 1, comprising the steps of:
condensing at least one fatty acid with diethylenetriamine or dipropylenediamine to form a reaction product,
and reacting the reaction product with at least one silicone oil of the general formula (V)

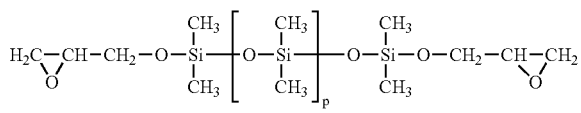

to prepare the wax of formula (I).

4. A process according to claim 3, wherein the silicone wax of formula (I) is quaternized to form the compound of formula (II).

5. A process according to claim 3, wherein the fatty acid is selected from the group consisting of: stearic acid, behenic acid and lauric acid.

6. A process for softening a textile substrate comprising the step of applying at least one of the silicone waxes according to claim 1 to a textile substrate.

7. An aqueous dispersion comprising at least one of the silicone waxes according to claim 1.

8. A process for preparing an amino-functional silicone wax of formula (III) according to claim 1, comprising the steps of:
condensing at least one fatty acid with diethylenetriamine or dipropylenediamine to form a reaction product,
and reacting the reaction product with at least one silicone oil of the general formula (VI)

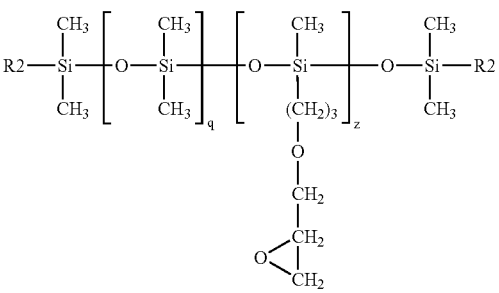

to prepare the wax of formula (III).

9. A process according to claim 8, wherein the silicone wax of formula (III) is quaternized to form the compound of formula (IV).

10. A process according to claim 8, wherein the fatty acid is selected from the group consisting of: stearic acid, behenic acid and lauric acid.

* * * * *